2,998,464
QUENCH SYSTEM
James C. Burleson and William A. Heckle, Texas City, and Alfred E. Withrow, Dickinson, Tex., assignors to Monsanto Chemical Company, St. Louis, Mo., a corporation of Delaware
Filed Aug. 5, 1957, Ser. No. 676,077
5 Claims. (Cl. 260—679)

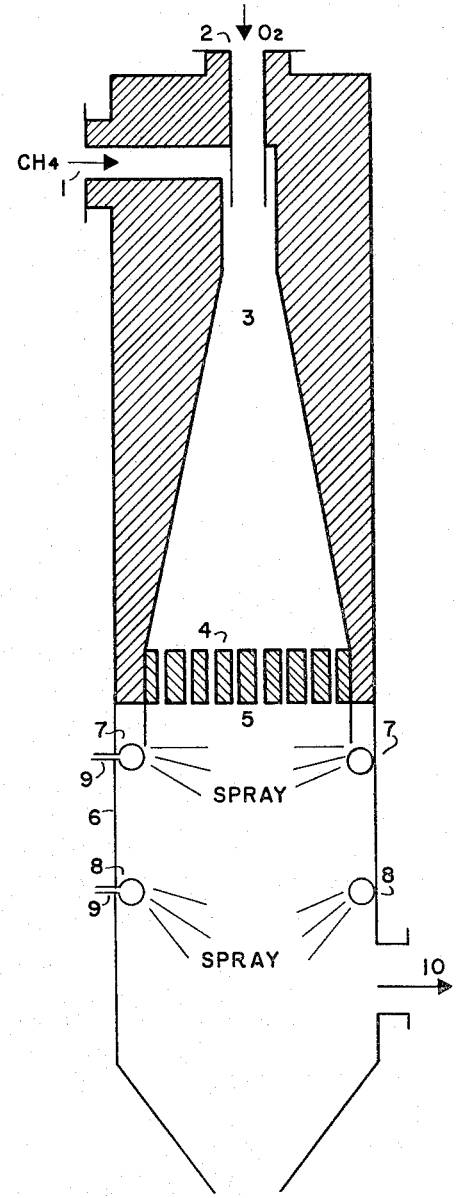
FIGURE I
JAMES C. BURLESON
WILLIAM A. HECKLE
ALFRED E. WITHROW
INVENTORS
ATTORNEY Aug. 29, 1961         J. C. BURLESON ET AL         2,998,464
                          QUENCH SYSTEM
Filed Aug. 5, 1957                              2 Sheets-Sheet 2
FIG. II
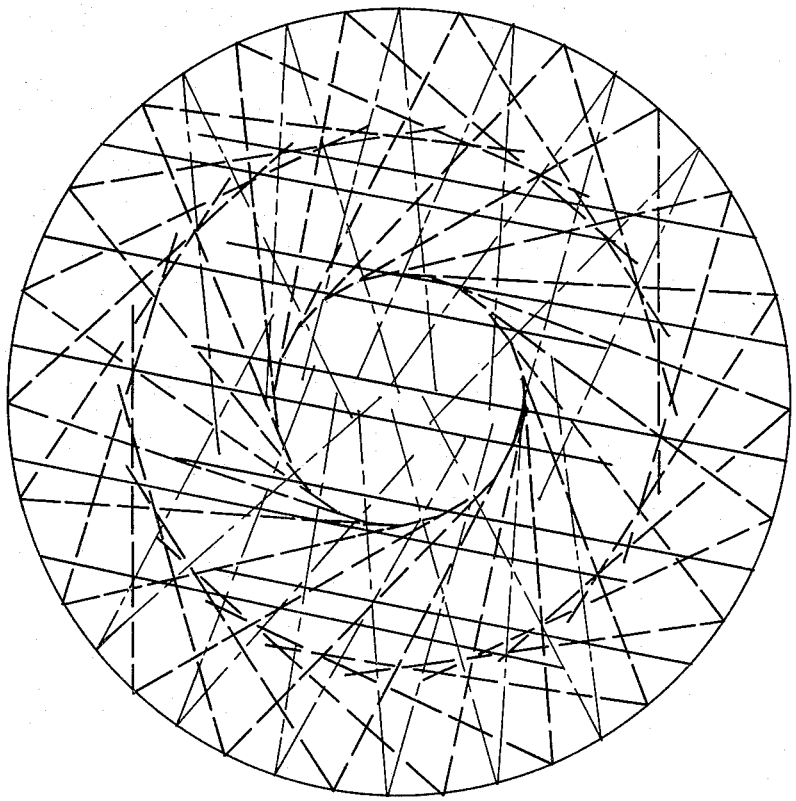
LEGEND:
HOLLOW CONE  — — —
FLAT JET     — - —
SOLID JET    ————
James C. Burleson
William A. Heckle
Alfred E. Withrow
             *INVENTORS*
BY
             ATTORNEY United States Patent Office 2,998,464
Patented Aug. 29, 1961

This invention pertains to chemical reactions carried out in the vapor phase at elevated temperatures and more particularly to the stopping of such reactions by quenching the reaction mixture with a liquid quenching medium to reduce the temperature of the reacting mixture to a temperature below the reaction temperature.

Many chemical reactions are carried out in a turbulent vapor phase at significantly elevated temperatures and frequently are accompanied with the actual formation of a flame during the reaction. In many such reactions, the reaction is stopped by bringing the reaction mixture into contact with a liquid cooling quenching medium, usually in the form of sprays, which suddenly lowers the temperature of the reacting mixture to a point below the minimum temperature at which the reaction or undesirable side reactions can proceed. Typical reactions of this type are the partial oxidation of hydrocarbons to produce carbon black, synthesis gas or hydrocarbons of a greater degree of unsaturation than the hydrocarbons oxidized. In the production of acetylene, for example, methane or other suitable hydrocarbons and oxygen are preheated, mixed and then ignited in a flame room. The reaction is stopped by quenching the flame by means of a series of water sprays situated circumferentially around the exit of the flame room. The water sprays quench the reacting mixture to a point below reaction temperature and acetylene is then recovered from the cooled cracked gases.

The size of the reactor and gas flow in such reactions is designed and adjusted to provide proper residence time. It has generally been recognized that adequate quenching requires that the quench fluid reach the center of the reaction mixture in order that the reaction be stopped throughout the entire mixture. Heretofore, spray design and quench patterns have been concerned almost exclusively with merely providing adequate quantities of quench fluid under conditions such that quenching to the center of the reaction mixture is obtained.

It is an object of this invention to provide an improved process for the quenching of reacting mixtures.

It is another object of this invention to provide an improved process for the quenching of flame reactions.

A particular object of this invention is to provide an improved process for quenching the reacting mixture obtained in the partial oxidation of hydrocarbons.

A still further object of this invention is to provide an improvement in the process for the production of acetylene by the partial oxidation of methane.

Other objects will become apparent from the description of the invention.

It has now been discovered that efficient quenching technique requires not only that the quench pattern reach the center of the reacting mixture to be quenched but also that the quench pattern be such that quenching be obtained to a substantially uniform degree across the cross-section of the reacting mixture in a plane perpendicular to the direction of flow of the reaction mixture.

Thus, this invention is utilized in processes wherein a chemical reaction is carried out in the vapor phase at elevated temperatures in a reaction zone and the reaction mixture quenched with a liquid quench spray in a quench zone to reduce the temperature of the reaction mixture, and comprises bringing the reaction mixture as it leaves the reaction zone into contact with a cooling liquid quench spray of a character such that the temperatures existing in the reaction mixture on a planar cross-section perpendicular to the direction of flow of the reaction mixture in the quench zone are decreased to a temperature below the reaction temperature at a substantially uniform rate.

The novel process of this invention is illustrated by the examples which follow.

For purposes of illustration only, the process of this invention is described herein in detail in connection with the partial oxidation of methane to produce acetylene. FIGURE I is a schematic sectional drawing of a conventional acetylene burner with its associated quenching zone on which the data set forth in the examples were obtained. FIGURE II is a symmetrical drawing of the horizontal spray pattern produced by a quench system of the type described in Example II. Reference to these drawings is made in the examples.

*Example 1*

The acetylene burner comprised a methane inlet 1 and oxygen inlet 2. Methane and oxygen were preheated before introduction into the elongated mixing chamber 3. The mixed gases passed through the cylindrical channels in diffusor 4 into the flame room 5. In the flame room the gas was ignited and passed to quench zone 6 equipped with quench rings 7 and 8. Quench rings 7 and 8 were rings fitted with various types of nozzles which will be described in more detail. Each quench ring was equipped with a water inlet 9. Cooled cracked gases were withdrawn through outlet 10 and acetylene recovered therefrom by conventional techniques. Due to the short residence time in the flame room required for the production of acetylene, only quench ring 7 is vitally associated with the process of this example insofar as this invention is concerned.

The flame room of the burner is in the shape of a regular hexagon. The quench ring 7 was first equipped with 44 hollow cone spray nozzles. These nozzles are designated as Model No. 1337–F, manufactured by the Spray Engineering Company. The angle of the hollow cone of water produced by this nozzle is 60°. The nozzle delivers 1.72 g.p.m. water at 75 p.s.i.g. The nozzles were affixed to quench ring 7 at 2½" intervals around the ring. The center of the cone was directed 30° down from the horizontal and 12° off center. The upper-most part of the spray cone entered the quench spray ¾" below the flame room. The tangent of the uppermost surface of the spray cone was essentially horizontal and perpendicular to the direction of flow of the reaction mixture. Water was fed to the quench ring at approximately 75 g.p.m. at 75 p.s.i.g. and a temperature of 80° C.

The cold quench ring 8 was positioned approximately 11" below the hot quench ring 7 and was equipped with 64 hollow cone nozzles of the type designated as Model No. 1148–F by Spray Engineering Company. The nozzles produced at 90° hollow cone of water and were positioned at a 45° angle down from the horizontal and 12° off center.

Methane was preheated to a temperature of 500° C. and fed to the burner at the rate of 3200 pounds per hour. Oxygen was preheated to 500° C. and fed to the burner at 3550 pounds per hour. On ignition in the flame room a temperature of approximately 1500° C. was obtained.

During this run the temperature at various intervals across the quench zone and at various distances below the flame room was determined. It was found that the temperature of the reaction mixture was significantly greater in the center of the quench zone than at the edges of the quench zone. At a distance of 2" below the flame room the temperature varied from approximately 400° C. at the edge of the quench zone to approximately 1000° C. in the center of the quench zone. Since this cracking reaction takes place at temperatures as low as 600° C., reaction was still occurring in the center of the quench zone 2" below the flame room. The cracked gas contained 7.8% acetylene at the cracked gas exit. Operating the unit with quench 7 turned off completely and only quench 8 operating, the cracked gas at the cracked gas exist contained 7.3% acetylene.

*Example II*

The procedure set forth in Example I was repeated with the exception that quench ring 7 was equipped with only 22 of the hollow cone sprays described in Example I which were alternately spaced with 12 flatjet sprays and 11 0.1" diameter jet sprays. The flatjet sprays were Model No. 1/4P1510 manufactured by Spraying Systems Company. This flatjet spray produces a pie-shaped spray of water which fans out horizontally at an angle of approximately 20°, with the bottom surface of the fan of water dropping at an angle of approximately 8° from the horizontal. The nozzle delivers 1.22 g.p.m. $H_2O$ at 75 p.s.i.g. The jet spray produces a 0.1" diameter jet of water and these jets entered the quench zone about ¼" below the flame room and were directed straight across the quench zone without any downward deflection. The flatjets entered the quench zone ½" below the edge of the flame room and met in the center of the quench zone about 2" below the flame room. The tops of the cone sprays were substantially horizontal and entered the quench zone approximately 1" below the edge of the flame room. The horizontal spray pattern produced by a quench system of the type described in this Example II is shown in FIGURE II.

Quench ring 8 was constructed as in Example I. Reaction conditions were maintained as set forth in Example I.

In this example the temperature profile of the quench zone revealed a more uniform quenching across the cross-section of the quench zone. At a distance of 2" below the flame room the temperature of the reaction mixture was below 600° C. across the entire quench zone. Comparing these results with those obtained in Example I, it is seen that this quench has resulted in the temperature existing in the reaction mixture on a planar cross-section perpendicular to the direction of flow of the reaction mixture being decreased to a temperature below the reaction temperature at a substantially uniform rate. In this case water was fed to the quench ring 7 at the rate of 77.1 g.p.m. at approximately 75 p.s.i.g. and a temperature of 80° C.—substantially the same amount fed to the quench ring in Example I.

In this example, cracked gas at the cracked gas exit contained 8.1% acetylene. Operating the burner with quench 7 turned completely off and only quench 8 operating, the cracked gas at the cracked gas exit contained 7.3% acetylene.

Comparison of Examples I and II clearly indicates the highly improved results obtained in accordance with the practice of the process of this invention.

In both examples all acetylene contents are expressed as mol percent of the total cracked gas mixture on a dry basis.

It will be obvious to those skilled in the art that the novel process of this invention can be varied substantially and is applicable to many processes. The type of individual spray nozzles used to accomplish substantially uniform quenching in accordance with this invention can necessarily be varied and their choice will in many cases be dictated by the configuration of both the reaction zone and the quench zone. Maintaining a substantially uniform quenching action across the entire cross section of the quench zone requires avoiding deflecting substantial quantities of water upwards or backwards into the flame room or reaction zone and adopting sprays which compensate for the downward or forward deflection of spray particles due to effect of gravity, collision between particles and drag effect of the reaction mixture—all effects which are particularly noticeable near the center of the quench zone.

While the examples have illustrated the application of the process of this invention to the production of acetylene, it is apparent that the process is not limited thereto. It is applicable to any process which is carried out in the vapor phase at elevated temperatures and which requires a rapid reduction in the temperature of the reacting mixture in order to stop the reaction at the desired point. While it is particularly applicable in the quenching of flame reactions it is not necessary that the reaction be accompanied with the production of a flame under reaction conditions in order for the process of this invention to be used. The partial oxidation of hydrocarbons, particularly saturated hydrocarbons such as methane, ethane, propane, butane, etc., to produce either synthesis gas or more unsaturated hydrocarbons are examples of specific processes in which the invention described herein is readily applicable.

It will be obvious that the quenching medium is not limited to water in the novel process of this invention. Any inert fluid can be used in the process in the manner specified herein.

What is claimed is:
1. In a chemical reaction wherein the reaction is carried out at an elevated temperature in the vapor phase in a reaction zone and the reaction mixture produced then quenched with a liquid quench medium in a quench zone to quickly reduce the temperature of the reaction mixture thereby stopping the reaction, the improvement which comprises quenching the reaction mixture to quickly reduce the temperature of the reaction mixture thereby stopping the reaction by bringing the reaction mixture into contact with a cooling liquid quench medium formed by a series of individual cooling hollow cone sprays intermixed with a series of individual cooling pie-shaped jet sprays and a series of individual cooling solid jets, all symmetrically positioned around the periphery of the quench zone where the reaction mixture enters into the quench zone and directed toward the central area of the quench zone where the reaction mixture enters into the quench zone.

2. In a chemical reaction wherein the reaction is carried out at an elevated temperature in the vapor phase with the production of a flame in a reaction zone and the reaction mixture produced then quenched with a liquid quench medium in a quench zone to quickly reduce the temperature of the reaction mixture thereby stopping the reaction, the improvement which comprises quenching the reaction mixture to quickly reduce the temperature of the reaction mixture thereby stopping the reaction by bringing the reaction mixture into contact with a cooling liquid quench medium formed by a series of individual cooling hollow cone sprays intermixed with a series of individual cooling pie-shaped jet sprays and a series of individual cooling solid jets, all symmetrically positioned around the periphery of the quench zone where the reaction mixture enters into the quench zone and directed toward the central area of the quench zone where the reaction mixture enters into the quench zone.

3. In a process for the partial oxidation of hydrocarbons wherein a hydrocarbon and an oxygen-containing gas are reacted at an elevated temperature in the vapor phase in a reaction zone and the reaction mixture produced then quenched with a liquid quench medium in a quench zone to quickly reduce the temperature of the reaction mixture thereby stopping the reaction, the improvement which comprises quenching the reaction mixture to quickly reduce the temperature of the reaction mixture thereby stopping the reaction by bringing the reaction mixture into contact with a cooling liquid quench medium formed by a series of individual cooling hollow cone sprays intermixed with a series of individual cooling pie-shaped jet sprays and a series of individual cooling solid jets, all symmetrically positioned around the periphery of the quench zone where the reaction mixture enters into the quench zone and directed toward the central area of the quench zone where the reaction mixture enters into the quench zone.

4. In a process for the production of acetylene wherein methane and oxygen are reacted at an elevated temperature in the vapor phase in a reaction zone and the reaction mixture produced then quenched with a liquid quench medium in a quench zone to quickly reduce the temperature of the reaction mixture thereby stopping the reaction, the improvement which comprises quenching the reaction mixture to quickly reduce the temperature of the reaction mixture thereby stopping the reaction by bringing the reaction mixture into contact with a cooling liquid quench medium formed by a series of individual cooling hollow cone sprays intermixed with a series of individual cooling pie-shaped jet sprays and a series of individual cooling solid jets, all symmetrically positioned around the periphery of the quench zone where the reaction mixture enters into the quench zone and directed toward the central area of the quench zone where the reaction mixture enters into the quench zone.

5. A process as described in claim 4 wherein the cooling liquid quench medium is water.

References Cited in the file of this patent

UNITED STATES PATENTS

| | | |
|---|---|---|
| 2,679,542 | Dorsey | May 25, 1954 |
| 2,719,184 | Kosbahn et al. | Sept. 27, 1955 |
| 2,765,359 | Pichler et al. | Oct. 2, 1956 |
| 2,789,148 | Schutte | Apr. 16, 1957 |
| 2,816,942 | Bills | Dec. 17, 1957 |
| 2,822,411 | Braconier et al. | Feb. 4, 1958 |

OTHER REFERENCES

Nieuwland: The Chemistry of Acetylene, Reinhold Publishing Corp., New York (1945), pp. 20–21.